3,399,202
6,7-DISUBSTITUTED QUINOLATES

Arthur A. Patchett, Cranford, and Edward F. Rogers, Middletown, N.J., and Robert L. Clark, West Chester, Pa., assignors to Merck & Co., Inc., Rahway, N.J., a corporation of New Jersey
No Drawing. Filed Dec. 22, 1965, Ser. No. 515,793
6 Claims. (Cl. 260—287)

ABSTRACT OF THE DISCLOSURE 6-haloalkoxy - 4 - hydroxyquinoline - 3 - carboxylates having alkoxy, loweralkyl or hydrogen at the 7-position, which substances have anticoccidial activity, are prepared by reacting 4-haloalkoxy aniline having alkoxy, loweralkyl or hydrogen at the 3-position with a diloweralkyl-loweralkoxy malonate, and heating the resulting product. Anticoccidial compositions are obtained by mixing said quinolates with an inert carrier.

This invention relates to new chemical compounds. More specifically, it relates to novel quinoline-3-carboxylates useful in combatting the poultry disease coccidiosis. Still more specifically, it is directed to loweralkyl-6-haloalkoxy-4-hydroxy-quinoline-3-carboxylates, intermediates thereof and their method of preparation. It is also concerned with the use of the carboxylates as coccidiostats and novel anti-coccidial compositions containing them.

Coccidiosis is a widespread poultry disease involving the invasion of caecal and intestinal mucosa by coccidia, specifically protozoan parasites of the genus Eimeria. The most important of these species are E. maxima, E. ascervulina, E. tenella, E. necatrix, E. brunetti, E. praecox and E. mitis. When left untreated, the severe form of the disease leads to poor weight gain, reduced feed efficiency, reduced egg production and high mortality. For these reasons, the control of coccidiosis is highly important to the poultry industry.

According to the present invention, it has been found that certain 6-haloalkoxy - 4-hydroxyquinoline-3-carboxylates are highly effective in the treatment and prevention of coccidiosis. An object of this invention, therefore, is to provide new chemical compounds useful in the control of coccidiosis. A further object is to provide novel compounds useful as intermediates in preparing the coccidiostats. Another object is to provide novel compositions containing the active compounds. A still further object is provision of methods of making such compounds and compositions. An additional object is provision of methods of combatting coccidiosis by administering to poultry minor amounts of the anticoccidial substances described herein. Further objects will become evident from the following discussion of the invention.

In accordance with the present invention, it has now been found that compounds represented by the structural Formula I possess significant anticoccidial activity,

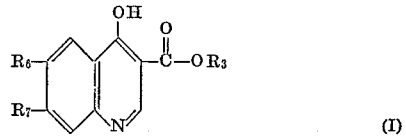

(I)

where $R_3$ is loweralkyl; $R_6$ is haloalkoxy having 2–4 carbon atoms; and $R_7$ is alkoxy having 2–5 carbon atoms, loweralkyl, or hydrogen.

The substituent $R_3$ in the above formula represents a loweralkyl group such as methyl, ethyl, propyl, butyl, isobutyl and the like, whereas $R_7$ represents hydrogen, an alkoxy group having 2–5 carbon atoms such as ethoxy, propoxy, isopropoxy, n-butoxy, isobutoxy, t-butoxy, pentoxy and the like, and loweralkyl such as methyl, propyl, ethyl, isopropyl, n-butyl, and the like.

A significant feature of the anticoccidial compounds of this invention is the substituent at the 6-position of the quinoline carboxylates defined by Formula I above. $R_6$ represents a haloalkoxy group having 2–4 carbon atoms, such as haloethoxy, halopropoxy, halobutoxy and the like. This substituent may contain halogen groups such as chloro, bromo, fluoro and iodo. Moreover, the haloalkoxy group at the 6-position may contain halogen moieties which may be the same or different. Preferably, such haloalkoxy group also has two fluoro groups on the alpha carbon and at least one hydrogen on the beta carbon. It is also preferred that these compounds contain in the groups at the 6-position no more than one halogen other than fluorine.

As illustrative of the compounds of this invention there may be mentioned methyl-4-hydroxy-6-($\alpha,\alpha,\beta,\gamma,\gamma,\gamma$-hexafluoropropyloxy)-
  7-isopropoxy-quinoline-3-carboxylate,
ethyl-4-hydroxy-6-($\alpha,\alpha$-difluoro-$\beta$-chloroethoxy)-
  7-n-butoxy-quinoline-3-carboxylate,
methyl-4-hydroxy-6-($\alpha,\alpha$-difluoro-$\beta$-bromoethoxy)-
  7-n-butyl-quinoline-3-carboxylate,
ethyl-4-hydroxy-6-($\alpha,\alpha,\beta$-trifluoro-$\beta$-chloroethoxy)-
  7-ethoxy-quinoline-3-carboxylate,
methyl-4-hydroxy-6-($\alpha,\alpha,\beta$-trifluoro-$\beta$-bromoethoxy)-
  quinoline-3-carboxylate,
methyl-4-hydroxy-6-($\alpha,\alpha$-difluoro-$\beta,\beta$-dichloroethoxy)-
  7-isopropyl-quinoline-3-carboxylate,
methyl-4-hydroxy-6-($\alpha,\alpha,\beta$-trifluoro-$\beta$-iodoethoxy)-
  7-n-pentoxy-quinoline-3-carboxylate,
methyl-4-hydroxy-6-($\alpha,\alpha,\beta,\beta$-tetrafluoroethoxy)-
  7-ethyl-quinoline-3-carboxylate,
methyl-4-hydroxy-6-($\alpha,\alpha,\beta,\gamma,\gamma$-pentafluoro-$\gamma$-chloropropoxy)-quinoline-3-carboxylate,
methyl-4-hydroxy-6-($\alpha,\alpha,\gamma,\gamma,\gamma$-pentafluoropropoxy)-
  7-isobutoxyquinoline-3-carboxylate, and
methyl-4-hydroxy-6-($\alpha,\alpha$-difluoro-$\beta$-(trifluoromethyl)-
  $\gamma,\gamma,\gamma$-trifluoro-$\alpha$-propoxy)-quinoline-3-carboxylate.

The quinoline - 3 - carboxylates defined by Formula I above are prepared by treating an appropriately substituted phenol with a halogenated 1-alkene, nitrating any desnitrobenzene obtained, hydrogenating the nitrobenzene to provide the amino derivative thereof, treating this aniline with a diloweralkyl loweralkoxy methylene malonate and heating the intermediate obtained thereby.

This reaction may be represented as follows:

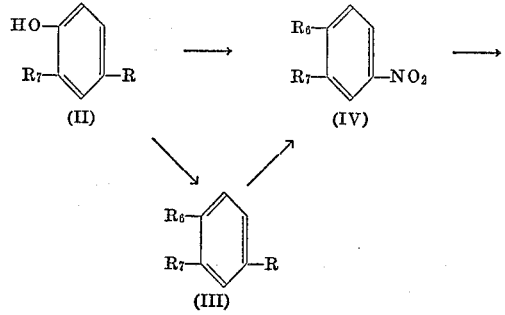

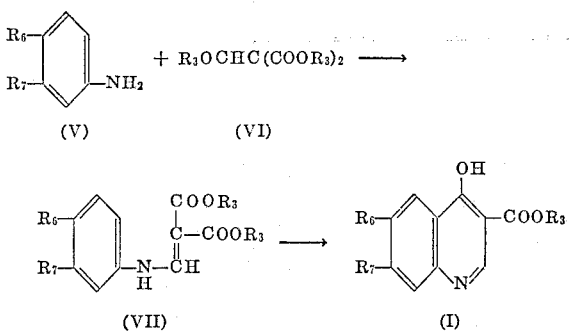

where R represents hydrogen or nitro and $R_3$, $R_6$ and $R_7$ are as earlier defined.

The above process for preparing (III) is carried out by dissolving the phenol in a non-hydroxylic solvent such as dioxane or dimethylformamide and adding a base such as an alkali or alkaline earth metal hydroxide, sodium hydride, sodium methoxide and the like. This mixture is cooled and the appropriate $\alpha,\alpha$-difluoro haloalkene-1 is added and the total mixture heated preferably at 60–150° C. under a pressure of greater than about 1 atmosphere gauge and preferably over 2 atmospheres. The solvents are then removed and the product worked up using conventional techniques such as extraction, washing and concentration.

When R represents hydrogen in Formula III above, the substituted nitrobenzene is obtainable by nitrating (III) with nitrating agent such as fuming nitric acid and the like. The substituted anilines (V) are preparable by reducing the corresponding substituted nitrobenzene with, for example, hydrogen using ruthenium, palladium or nickel as a hydrogenation catalyst.

In the next step of the above synthesis, a substituted aniline of Formula V above is treated with a dilower-alkyl loweralkoxy methylene malonate of Formula VI in solvent. Solvents such as alcohols, e.g. loweralkanols such as ethanol and isopropanol, ethers such as diethylether, dioxane, diethylene glycol, dimethylether, ethylene glycol dimethylether, and the like are useful in this regard. The reactants are preferably present in a molar ratio of 1:1 but this may vary somewhat without substantial adverse effect on the quantity of acrylate (VII) to be obtained. This reaction may be carried out at 40°–120° C. but temperatures in the range of 80°–100° C. are preferred.

The acrylate may then be converted to the quinoline-3-carboxylate by treatment with heat. Temperatures of from 200–300° C. are satisfactory with 240–260° C. being preferred. Although not essential to the success of this process, it is preferred that a solvent be employed to better satisfy heat transfer requirements and to improve the yield of product. Solvents which might be used in this regard include dimethylsulfone, dodecylbenzene, biphenyl, diphenylether, and other similar high-boiling solvents.

In accordance with another aspect of the invention, the novel quinoline-3-carboxylates described according to Formula I above are prepared by esterfying the corresponding quinoline-3-carboxylic acid. This provides an additional method for preparing the novel carboxylates which is at times more readily performed than that earlier described. This process is effected by treating the acid with a strong concentrated mineral acid such as phosphoric acid, hydrochloric acid, sulphuric acid, and the like, and an appropriate loweralkanol. The temperature should be maintained at about 75°–150° C., conveniently at about 100° C. for several hours. The remaining alkanol may be removed in vacuo and the residue is worked up by conventional techniques such as neutralization, dissolution and crystallization.

According to still another method of the present invention, the compounds of Formula I are preparable from the corresponding quinoline-3-carboxylic acid halide. The acid halide is treated with a loweralkanol, e.g. methanol, at 40°–160° C. The reaction mixture may then be filtered. The carboxylate product is obtained by cooling the filtrate. Dissolution, recrystallization, charcoal treatment, and the like may be used in purification of this material.

Many of the haloalkene starting materials are commercially available. Others may be prepared by standard methods known in the art such as that described in the book Chemistry of Organic Fluorine Compounds by Milos Hudlicky (Macmillan & Co., 1962) on pages 128–133.

As has been previously stated, the carboxylates of Formula I are new and novel coccidiostats. It should also be noted, however, that in accordance with an additional aspect of this invention, there are prepared 6-haloalkoxyquinolines of the formula

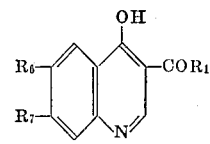

where $R_1$ represents hydroxy and halo and $R_6$ and $R_7$ are as earlier defined.

The quinoline-3-carboxylic acids are obtainable from the compounds of Formula I by heating the latter with dilute sodium hydroxide and adding the resulting mixture to mineral acid in alcohol, e.g. hydrochloric acid in methanol. The acid chloride is derived from the acid by, for example, treatment with thionyl chloride at about 80° C.

According to the present invention it has been found that the compounds of Formula I above are highly effective for the treatment or prevention of coccidiosis. For this purpose, they are administered to poultry as a component of the feed or drinking water.

Although every carboxylate within the purview of this invention does not have the same degree of anticoccidial efficacy, all are active. The amount of active agent necessary for adequate control of the disease will vary with the severity of infection, the duration of treatment and, as indicated above, the particular compound employed as the coccidiostat.

It is one aspect of this invention to provide novel compositions in which the compounds defined by Formula I are present as the active anticoccidial ingredient. Such compositions comprise the quinoline-3-carboxylates intimately dispersed in or admixed with an inert carrier or diluent. By an inert carrier is meant one that is essentially nonreactive with the active anticoccidial ingredient and that may be administered with safety to the animals. In the case of solid compositions, the carrier or diluent is preferably one that is orally ingestible and that is or may be an ingredient of the animal feed. Preferred drinking water formulations are water-soluble powders, aqueous suspensions, or solutions.

The compositions which are one of the preferred features of the invention are feed supplements in which the active anticoccidial ingredient is present in relatively large amounts in a poultry feed additive. Diluents which are normally employed for these animal feed supplements are solid orally ingestible poultry feed additives such as distiller's dried grains, corn meal, citrus meal, crushed limestone, and the like. The diluents preferred have nutritive value to the poultry and are normal ingredients of the finished feed. These supplements are incorporated in the poultry feed either directly or in an intermediate dilution or blending step. These premixes or feed supplements may contain about 5–50% by weight of the active ingredient.

It will be understood that the quinoline-3-carboxylates of this invention may also be admixed with other coccidiostats and used in conjunction therewith.

Examples of typical feed supplements containing a quinoline-3-carboxylate of this invention are accordingly as follows:

A | Lbs.
--- | ---
Methyl-4-hydroxy-6-($\beta$ - chloro - $\alpha,\alpha,\beta$ - trifluoroethoxy)-7-isopropoxy-quinoline-3-carboxylate | 10
Corn meal | 90

B 1-(2 - n - propyl-4-amino-5-pyrimidylmethyl)-2-methyl pyridinium chloride hydrochloride _____ 2
Ethyl-4-hydroxy-6-($\beta$-chloro-$\alpha,\alpha,\beta$ - trifluoroethoxy)-7-n-propyl-quinoline-3-carboxylate _____ 6
Distiller's dried grains _____ 92

Finished feeds may be a mash containing ground grain, animal and vegetable proteins, mineral and vitamin concentrates, or it may be a broiler feed containing a large proportion of ground yellow corn together with other nutritive substances such as fish meal, soybean oil meal, meat products, minerals and vitamins. Feed levels of drug of from about 0.0005% to about 0.05% by weight are effective in controlling coccidiosis, with concentrations of about 0.0025% to 0.025% by weight of feed being preferred. It should be understood that high feed levels within these ranges may be employed when using the compounds therapeutically for relatively short periods of time whereas lower feed levels are useful when the compounds are used prophylactically. It is desirable to employ the lowest levels that afford adequate control of the disease to minimize risk of side effects that might appear on prolonged feeding of the compounds. When the active agents are administered by way of the drinking water, somewhat lower levels than those in feed will be satisfactory since the birds drink about twice as much as they eat. The use of the active agent in drinking water is made more practically useful by addition to the water of a suspending agent such as acacia, tragacanth, Veegum (colloidal magnesium-aluminum silicate, R. E. Vanderbilt Co.), carboxypolymethylene, algins, methylcellulose, hydroxyethylcellulose and others, which promotes even distribution of the water insoluble material.

The following examples are given for the purpose of illustration and not by way of limitation.

EXAMPLE 1

Methyl-4-hydroxy-6-($\beta$-chloro-$\alpha,\alpha,\beta$-trifluoroethoxy-7-isopropoxy-quinoline-3-carboxylate Ten grams of 2-isopropoxy-4-nitrophenol is dissolved in 75 ml. of dimethyl formamide in a bomb tube. 0.5 g. of sodium methoxide is added and the solution cooled and 7.5 g. of trifluorochloroethylene condensed in the mixture. The bomb tube is sealed and heated to 100° C. for five hours. The reaction mixture is then added to 500 ml. of water and the 3-isopropoxy-4-($\alpha,\alpha,\beta$-trifluoro-$\beta$-chloroethoxy)-nitrobenzene is extracted with ether. After washing the ether with dilute sodium hydroxide and water, the ether is removed to yield the purified product.

When the above process is carried out and trifluorobromoethylene, trifluoroiodoethylene, 1,1-difluoro-2,2-dichloroethylene, tetrafluoroethylene, 1,1-difluoroethylene or perfluoropropylene-1 is used in place of trifluorochloroethylene in the above process, there is obtained 3-isopropoxy-4-($\beta$-bromo-$\alpha,\alpha,\beta$-trifluoroethoxy)-nitrobenzene
3-isopropoxy-4-($\beta$-iodo-$\alpha,\alpha,\beta$-trifluoroethoxy)-nitrobenzene,
3-isopropoxy-4-($\beta,\beta$-dichloro-$\alpha,\alpha$-difluoroethoxy)-nitrobenzene,
3-isopropoxy-4-($\alpha,\alpha,\beta,\beta$-tetrafluoroethoxy)-nitrobenzene,
3-isopropoxy-4-($\alpha,\alpha$-difluoroethoxy)-nitrobenzene, or
3-isopropoxy-4-($\alpha,\alpha,\beta,\gamma,\gamma,\gamma$-hexafluoropropoxy)-nitrobenzene, respectively.

When 2-n-propyl-4-nitrophenol, 2-n - pentoxy-4-nitrophenol or 4-nitrophenol is used in the above process in place of 2-isopropoxy-4-nitrophenol, there is obtained 3-n-propyl-4-($\alpha,\alpha,\beta$-trifluoro-$\beta$-chloroethoxy)-nitrobenzene,
3-n-pentoxy-4-($\alpha,\alpha,\beta$-trifluoro-$\beta$-chloroethoxy)-nitrobenzene, or
4-($\alpha,\alpha,\beta$-trifluoro-$\beta$-chloroethoxy) - nitrobenzene, respectively.

Ten grams of 3-isopropoxy-4-($\alpha,\alpha,\beta$-trifluoro-$\beta$-chloroethoxy)-nitrobenzene is hydrogenated in 150 ml. of ethanol at room temperature and 40 p.s.i.g. hydrogen using 3 g. of ruthenium as catalyst. The catalyst is filtered giving 3 - isopropoxy-4-($\alpha,\alpha,\beta$-trifluoro-$\beta$-chloroethoxy)-aniline.

8 grams of 3 - isopropoxy - 4 - ($\beta$-chloro-$\alpha,\alpha,\beta$-trifluoroethoxy)-aniline is added to 5 g. of dimethylmethoxy methylene malonate and the solution is heated on the steam bath until all the solvent is evaporated. Toluene is added, evaporated in vacuo and this purification process repeated. The residue is methyl-$\alpha$-carbmethoxy-$\beta$-[3-isopropoxy - 4 - ($\beta$ - chloro-$\alpha,\alpha,\beta$-trifluoroethoxy)-anilino]-acrylate. This product is added to a stirred solution of 180 ml. of dodecyl benzene at 250° C. After 25 minutes at this temperature, the mixture is cooled and the brown solid separated by filtration. It is then crystallized from boiling acetic acid to give substantially pure methyl-4-hydroxy - 6 - ($\beta$-chloro-$\alpha,\alpha,\beta$-trifluoroethoxy)-7-isopropoxy-quinoline-3-carboxylate; M.P. 278–281° C.

Ethyl - 4 - hydroxy - 6 - (2 - chloro - 1,1,2 - trifluoroethoxy) - 7 - isopropoxy-quinoline - 3 - carboxylate is prepared by the above method, but diethylethoxy methylene malonate is used instead of dimethylmethoxy methylene malonate. This product is crystallized from dimethyl formamide and has a M.P. of 298–299° C.

When the above process is carried out and 4-($\beta$-chloro-$\alpha,\alpha,\beta$-trifluoroethoxy)-aniline,
3-ethoxy-4-($\beta$-chloro-$\alpha,\alpha,\beta$-trifluoroethoxy)-aniline,
3-isobutoxy-4-($\beta$-chloro-$\alpha,\alpha,\beta$-trifluoroethoxy)-aniline, or
3-n-propoxy-4-($\beta$-chloro-$\alpha,\alpha,\beta$-trifluoroethoxy)-aniline is used in place of 3 - isopropoxy - 4 - ($\beta$-chloro-$\alpha,\alpha,\beta$-trifluoroethoxy)-aniline, there is obtained methyl-4-hydroxy-6-($\beta$-chloro-$\alpha,\alpha,\beta$-trifluoroethoxy)-quinoline-3-carboxylate,
methyl-4-hydroxy-6-($\beta$-chloro-$\alpha,\alpha,\beta$-trifluoroethoxy)-7-ethoxy-quinoline-3-carboxylate,
methyl-4-hydroxy-6-($\beta$-chloro-$\alpha,\alpha,\beta$-trifluoroethoxy)-7-isobutoxy-quinoline-3-carboxylate, or
methyl-4-hydroxy-6-($\beta$-chloro-$\alpha,\alpha,\beta$-trifluoroethoxy)-7-n-propoxy-3-carboxylate.

When 3-isopropoxy-4-($\beta$-bromo-$\alpha,\alpha,\beta$-trifluoroethoxy)-aniline,
3-isopropoxy-4-($\beta$-iodo-$\alpha,\alpha,\beta$-trifluoroethoxy)-aniline,
3-isopropoxy-4-($\beta,\beta$-dichloro-$\alpha,\alpha$-difluoroethoxy)-aniline,
3-isopropoxy-4-($\alpha,\alpha,\beta,\beta$-tetrafluoroethoxy)-aniline,
3-isopropoxy-4-($\alpha,\alpha$-difluoroethoxy)-aniline, or
3-isopropoxy-4-($\alpha,\alpha,\beta,\gamma,\gamma,\gamma$-hexafluoropropoxy)-aniline is used in the above process in place of
3-isopropoxy-4-($\beta$-chloro-$\alpha,\alpha,\beta$-trifluoroethoxy) - aniline, there is obtained methyl-4-hydroxy-6-($\beta$-bromo-$\alpha,\alpha,\beta$-trifluoroethoxy)-7-isopropoxy-quinoline-3-carboxylate,
methyl-4-hydroxy-6-($\beta$-iodo-$\alpha,\alpha,\beta$-trifluoroethoxy-7-isopropoxy-quinoline-3-carboxylate,
methyl-4-hydroxy-6-($\beta,\beta$-dichloro-$\alpha,\alpha$-difluoroethoxy)-7-isopropoxy-quinoline-3-carboxylate,
methyl-4-hydroxy-6-($\alpha,\alpha,\beta,\beta$-tetrafluoroethoxy)-7-isopropoxy-quinoline-3-carboxylate,
methyl-4-hydroxy-6-($\alpha,\alpha$-difluoroethoxy)-7-isopropoxy-quinoline-3-carboxylate, or
methyl-4-hydroxy-6-($\alpha,\alpha,\beta,\gamma,\gamma,\gamma$-hexafluoropropoxy)-7-isopropoxy-quinoline-3-carboxylate, respectively.

EXAMPLE 2

Ethyl-4-hydroxy-6-($\alpha,\alpha,\beta$-trifluoro-$\beta$-chloroethoxy)-7-n-propyl-quinoline-3-carboxylate To 10.3 g. of 3-n-propyl-4-($\alpha,\alpha,\beta$-trifluoro-$\beta$-chloroethoxy)-aniline in 100 ml. of methanol is added 10.8 g. of diethylethoxy methylene malonate. The mixture is heated on the steam bath for 2 hours. The solvent is removed in vacuo leaving ethyl - $\alpha$ - carbethoxy-$\beta$-[3-n-propyl - 4 - $\alpha,\alpha,\beta$ - trifluoro-$\beta$-chloroethoxy)-anilino]-acrylate. This acrylate is added to a stirred solution of 100 ml. of dodecyl benzene at 245–250° C. The temperature is maintained for 30 minutes. After cooling to room temperature, the product is removed by filtration. Washing with hexane and acetone gives ethyl-4-6-($\alpha,\alpha,\beta$-trifluoro - $\beta$ - chloroethoxy) - 7 - n - propyl-quinoline-3-carboxylate; M.P. 272–274° C.

The methyl ester is prepared in the same manner as above, except that 8.7 g. of dimethylmethoxy methylene malonate is used in place of diethylethoxy methylene malonate. It has a melting point of 283.5–285.5° C.

When 3-n-propyl-4-($\beta$-bromo-$\alpha,\alpha,\beta$-trifluoroethoxy)-aniline,
3-n-propyl-4-($\beta$-iodo-$\alpha,\alpha,\beta$-trifluoroethoxy)-aniline,
3-n-propyl-4-($\beta,\beta$-dichloro-$\alpha,\alpha$-difluoroethoxy)-aniline,
3-n-propyl-4-($\alpha,\alpha,\beta,\beta$-tetrafluoroethoxy)-aniline,
3-n-propyl-4-($\alpha,\alpha$-difluoroethoxy)-aniline, or
3-n-propyl-4-($\alpha,\alpha,\beta,\gamma,\gamma,\gamma$-hexafluoropropoxy)-aniline is used in the above process in place of 3-n-propyl-4-($\alpha,\alpha,\beta$-trifluoro-$\beta$-chloroethoxy)-aniline, there is obtained ethyl-4-hydroxy-6-($\beta$-bromo-$\alpha,\alpha,\beta$-trifluoroethoxy)-7-n-propyl-quinoline-3-carboxylate,
ethyl-4-hydroxy-6-($\beta$-iodo-$\alpha,\alpha,\beta$-trifluoroethoxy)-7-n-propyl-quinoline-3-carboxylate,
ethyl-4-hydroxy-6-($\beta,\beta$-dichloro-$\alpha,\alpha$-difluoroethoxy)-7-n-propyl-quinoline-3-carboxylate,
ethyl-4-hydroxy-6-($\alpha,\alpha,\beta,\beta$-tetrafluoroethoxy)-7-n-propyl-quinoline-3-carboxylate,
ethyl-4-hydroxy-6-($\alpha,\alpha$-difluoroethoxy)-7-n-propyl-quinoline-3-carboxylate, or
ethyl-4-hydroxy-6-($\alpha,\alpha,\beta,\gamma,\gamma,\gamma$-hexafluoropropoxy)-7-n-propyl-quinoline-3-carboxylate, respectively.

When 3 - ethyl - 4 - ($\alpha,\alpha,\beta$ - trifluoro - $\beta$-chloroethoxy)-aniline is used in place of 3 - n - propyl - 4 - ($\alpha,\alpha,\beta$-trifluoro - $\beta$-trifluoro-$\beta$-chloroethoxy)-aniline in the above process, ethyl - 4 - hydroxy-6-($\alpha,\alpha,\beta$-trifluoro-$\beta$-chloroethoxy)-7-ethyl-quinoline-3-carboxylate is obtained.

EXAMPLE 3

Ethyl-4-hydroxy-6-($\alpha,\alpha,\beta$-trifluoro-$\beta$-chloroethoxy)-7-isopropoxy-quinoline-3-carboxylate To a suspension of 1.0 g. of 4 - hydroxy - 6 - ($\alpha,\alpha,\beta$-trifluoro - $\beta$ - chloroethoxy) - 7 - isopropoxy-quinoline-3-carboxylic acid in 25 ml. of absolute ethanol is added 2.5 ml. of concentrated sulfuric acid. The resulting solution is heated on the steam bath for 20 hours. Most of the ethanol is removed in vacuo and the residue, with cooling, is neutralized with 10% sodium carbonate. The precipitate is separated and crystallized from ethanol-water (1:1); M.P. 298–299° C.

When the above process is carried out and 4-hydroxy-6-($\beta$-bromo-$\alpha,\alpha,\beta$-trifluoroethoxy)-7-isopropoxy-quinoline-3-carboxylic acid,
4-hydroxy-6-($\beta$-iodo-$\alpha,\alpha,\beta$-trifluoroethoxy)-7-isopropoxy-quinoline-3-carboxylic acid,
4-hydroxy-6-($\beta,\beta$-dichloro-$\alpha,\alpha$-difluoroethoxy)-7-isopropoxy-quinoline-3-carboxylic acid,
4-hydroxy-6-($\alpha,\alpha,\beta,\beta$-tetrafluoroethoxy)-7-isopropoxy-quinoline-3-carboxylic acid,
4-hydroxy-6-($\alpha,\alpha$-difluoroethoxy)-7-isopropoxy-quinoline-3-carboxylic acid, or
4 - hydroxy - 6-($\alpha,\alpha,\beta,\gamma,\gamma,\gamma$-hexafluoropropoxy)-7-isopropoxy-quinoline-3-carboxylic acid is used in place of 4-hydroxy-6-($\alpha,\alpha,\beta$-trifluoro-$\beta$-chloroethoxy)-7-isopropoxy-quinoline-3-carboxylic acid, there is obtained ethyl-4-hydroxy-6-($\beta$-bromo-$\alpha,\alpha,\beta$-trifluoroethoxy)-7-isopropoxy-quinoline-3-carboxylate,
ethyl-4-hydroxy-6-($\beta$-iodo-$\alpha,\alpha,\beta$-trifluoroethoxy)-7-isopropoxy-quinoline-3-carboxylate,
ethyl-4-hydroxy-6-($\beta,\beta$-dichloro-$\alpha,\alpha$-difluoroethoxy)-7-isopropoxy-quinoline-3-carboxylate,
ethyl-4-hydroxy-6-($\alpha,\alpha,\beta,\beta$-tetrafluoroethoxy)-7-isopropoxy-quinoline-3-carboxylate,
ethyl-4-hydroxy-6-($\alpha,\alpha$-difluoroethoxy)-7-isopropoxy-quinoline-3-carboxylate, or
ethyl-4-hydroxy-6-($\alpha,\alpha,\beta,\gamma,\gamma,\gamma$-hexafluoropropoxy)-7-isopropoxy-quinoline-3-carboxylate, respectively.

When the above process is carried out and n-propanol is used in place of ethanol, there is obtained n-propyl-4-hydroxy - 6-($\alpha,\alpha,\beta$-trifluoro-$\beta$-chloroethoxy(-7-isopropoxy-quinoline-3-carboxylate.

When 4-hydroxy-6-($\alpha,\alpha,\beta$-trifluoro-$\beta$-chloroethoxy)-7-n-propoxy-quinoline-3-carboxylic acid,
4-hydroxy-6-($\alpha,\alpha,\beta$-trifluoro-$\beta$-chloroethoxy)-7-n-propyl-quinoline-3-carboxylic acid,
or 4-hydroxy-6-($\alpha,\alpha,\beta$-trifluoro-$\beta$-chloroethoxy)-quinoline-3-carboxylic acid, is used in the above process in place of 4-hydroxy-6-($\alpha,\alpha,\beta$-trifluoro-$\beta$-chloroethoxy)-7-isopropoxy-quinoline-3-carboxylic acid, there is obtained ethyl-4-hydroxy-6-($\alpha,\alpha,\beta$-trifluoro-$\beta$-chloroethoxy)-7-n-propoxy-quinoline-3-carboxylate,
ethyl-4-hydroxy-6-($\alpha,\alpha,\beta$-trifluoro-$\beta$-chloroethoxy)-7-n-propyl-quinoline-3-carboxylate, or
ethyl-4-hydroxy-6-($\alpha,\alpha,\beta$-trifluoro-$\beta$-chloroethoxy)-quinoline-3-carboxylate, respectively.

EXAMPLE 4

Methyl-4-hydroxy-6-($\alpha,\alpha,\beta$-trifluoro-$\beta$-chloroethoxy)-7-isopropoxy-quinoline-3-carboxylate 2 grams of 4 -hydroxy - 6 - ($\alpha,\alpha,\beta$ - trifluoro-$\beta$-chloroethoxy) - 7 - isopropoxy-quinoline - 3 - carboxylic acid is refluxed in benzene with a molar equivalent of thionyl chloride for 8 hours. The resulting acid chloride in 40 ml. of methanol is heated on the steam bath at reflux for 5 hours. While the reaction mixture is still hot, it is filtered. The filtrate is allowed to cool and the solid which separates is filtered and washed with ether. The product is then recrystallized from dimethylformamide to give substantially pure methyl - 4-hydroxy-6-($\alpha,\alpha,\beta$-trifluoro-$\beta$-chloroethoxy) - 7 - isopropoxy - quinoline - 3 - carboxylate; M.P. 278–281° C.

When the above process is carried out and n-propanol is used in place of methanol, there is obtained n-propyl-4 - hydroxy - 6 - ($\alpha,\alpha,\beta$-trifluoro-$\beta$-chloroethoxy)-7-isopropoxy-quinoline-3-carboxylate.

When the above process is carried out and 4-hydroxy-6-($\beta$-bromo-$\alpha,\alpha,\beta$-trifluoroethoxy)-7-isopropoxy-quinoline-3-carboxylic acid,
4-hydroxy-6-($\beta$-iodo-$\alpha,\alpha,\beta$-trifluoroethoxy)-7-isopropoxy-quinoline-3-carboxylic acid,
4-hydroxy-6-($\beta,\beta$-dichloro-$\alpha,\alpha$-difluoroethoxy)-7-isopropoxy-quinoline-3-carboxylic acid,
4-hydroxy-6-($\alpha,\alpha,\beta,\beta$-tetrafluoroethoxy)-7-isopropoxy-quinoline-3-carboxylic acid, 4-hydroxy-6-($\alpha,\alpha$-difluoroethoxy)-7-isopropoxy-quinoline-3-carboxylic acid, or 4-hydroxy-6-($\alpha,\alpha,\beta,\gamma,\gamma,\gamma$-hexafluoropropoxy)-7-isopropoxy-quinoline-3-carboxylic acid is used in place of 4-hydroxy-6-($\alpha,\alpha,\beta$-trifluoro-$\beta$-chloroethoxy)-7-isopropoxy-quinoline-3-carboxylic acid, there is obtained methyl-4-hydroxy-6-($\beta$-bromo-$\alpha,\alpha,\beta$-trifluoroethoxy)-7-isopropoxy-quinoline-3-carboxylate, methyl-4-hydroxy-6-($\beta$-iodo-$\alpha,\alpha,\beta$-trifluoroethoxy)-7-isopropoxy-quinoline-3-carboxylate, methyl-4-hydroxy-6-($\beta,\beta$-dichloro-$\alpha,\alpha$-difluoroethoxy)-7-isopropoxy-quinoline-3-carboxylate, methyl-4-hydroxy-6-($\alpha,\alpha,\beta,\beta$-tetrafluoroethoxy)-7-isopropoxy-quinoline-3-carboxylate, methyl-4-hydroxy-6-($\alpha,\alpha$-difluoroethoxy)-7-isopropoxy-quinoline-3-carboxylate, or methyl-4-hydroxy-6-($\alpha,\alpha,\beta,\gamma,\gamma,\gamma$-hexafluoropropoxy)-7-isopropoxy-quinoline-3-carboxylate, respectively.

When 4-hydroxy-6-($\alpha,\alpha,\beta$-trifluoro-$\beta$-chloroethoxy)-7-n-propoxy-quinoline-3-carboxylic acid, 4-hydroxy-6-($\alpha,\alpha,\beta$-trifluoro-$\beta$-chloroethoxy)-7-n-propyl-quinoline-3-carboxylic acid or 4-hydroxy-6-($\alpha,\alpha,\beta$-trifluoro-$\beta$-chloroethoxy)-quinoline-3-carboxylic acid is used in the above process in place of 4-hydroxy-6-($\alpha,\alpha,\beta$-trifluoro-$\beta$-chloroethoxy)-7-isopropoxy-quinoline-3-carboxylic acid, there is obtained methyl-4-hydroxy-6-($\alpha,\alpha,\beta$-trifluoro-$\beta$-chloroethoxy)-7-n-propoxy-quinoline-3-carboxylate, methyl-4-hydroxy-6-($\alpha,\alpha,\beta$-trifluoro-$\beta$-chloroethoxy)-7-n-propyl-quinoline-3-carboxylate or methyl-4-hydroxy-6-($\alpha,\alpha,\beta$-trifluoro-$\beta$-chloroethoxy)-quinoline-3-carboxylate, respectively.

It should be understood that although this invention has been described with reference to particular embodiments thereof, changes and modifications may be made which are within its intended scope and it should be limited only by the language of the appended claims.

What is claimed is:
1. A compound of the formula

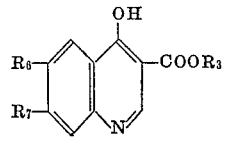

where $R_3$ is loweralkyl; $R_6$ is haloalkoxy having 2–4 carbon atoms; and $R_7$ is loweralkoxy having 2–5 carbon atoms or loweralkyl.

2. A compound according to claim 1 where $R_6$ is $\alpha,\alpha,\beta$-trifluoro-$\beta$-chloroethoxy.

3. A compound according to claim 2 where $R_3$ is methyl.

4. A compound according to claim 3 where $R_7$ is isoproxy.

5. A compound according to claim 3 where $R_7$ is n-propyl.

6. A compound of the formula

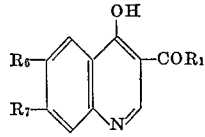

where $R_1$ is hydroxy or halo; $R_6$ is haloalkoxy having 2–4 carbon atoms; and $R_7$ is loweralkoxy having 2–5 carbon atoms or loweralkyl.

References Cited

UNITED STATES PATENTS 3,316,147   4/1967   Watson.

NICHOLAS S. RIZZO, *Primary Examiner.*

DONALD G. DAUS, *Assistant Examiner.*